United States Patent Office 3,584,065
Patented June 8, 1971

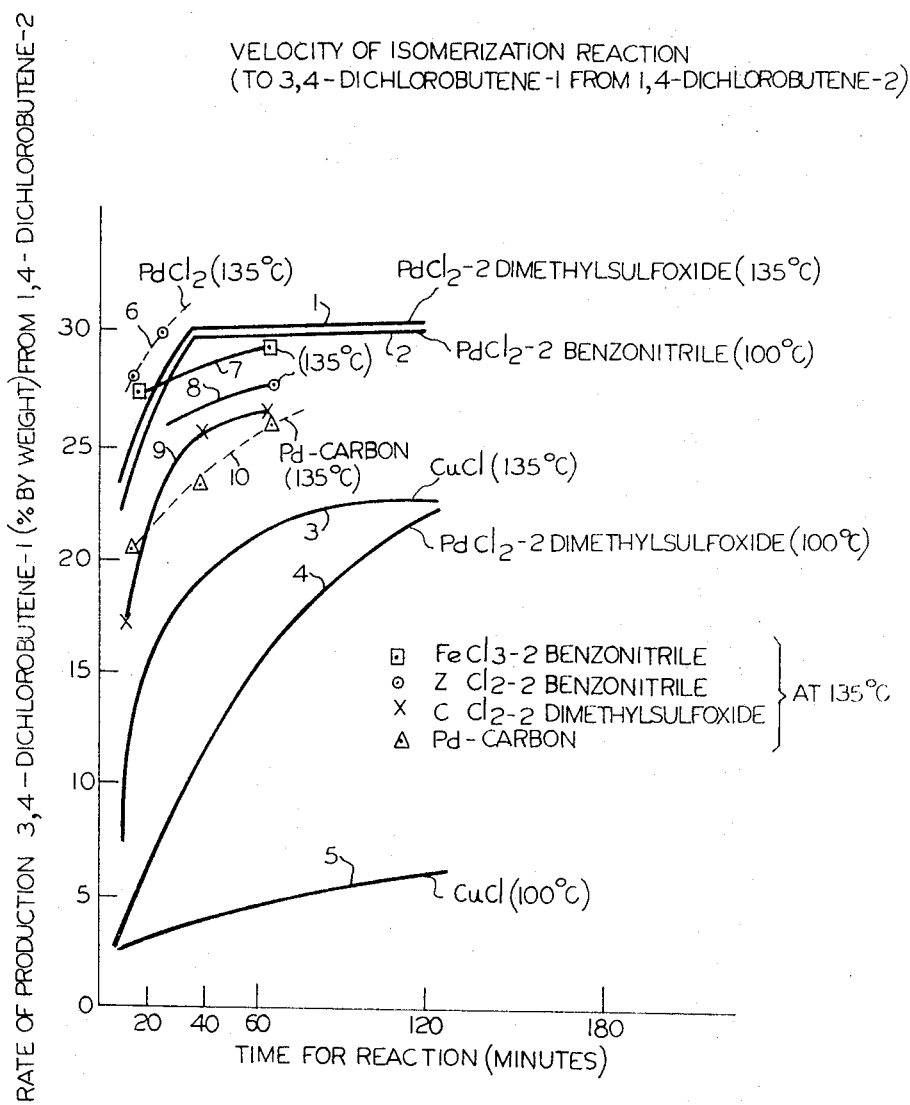

3,584,065
METHOD OF OBTAINING 3,4-DICHLORO-BUTENE-1
Akio Oshima, Kobe, Japan, assignor to Kanegafuchi Chemical Industry Co., Ltd., Osaka, Japan
Filed May 8, 1967, Ser. No. 636,762
Claims priority, application Japan, June 23, 1966, 41/41,053
Int. Cl. C07c 17/24; B01j 11/84
U.S. Cl. 260—654                         5 Claims

ABSTRACT OF THE DISCLOSURE

A method of obtaining 3,4-dichlorobutene-1 by isomerizing 1,4-dichlorobutene-2 in the presence of a catalyst selected from the group consisting of (1) palladium, (2) palladous chloride, (3) benzonitrile and dimethylsulfoxide complexes of palladous chloride, (4) benzonitrile and dimethylsulfoxide complexes of chlorides of copper, zinc and iron, and (5) mixtures thereof.

This invention relates to a method of obtaining 3,4-dichlorobutene-1.

1,4-dichlorobutene-2 and 3,4-dichlorobutene-1 are isomers of each other. Dichlorobutene, which may be obtained by chlorinating butadiene, is the mixture of the two mentioned compounds. Between these two isomers, there exists a state of balance in correspondence to its temperature. Depending upon the temperature, the proportion of these two isomers in their mixture indicates a static state of equilibrium.

In isomerizing 1,4-dichlorobutene-2 into 3,4-dichlorobutene-1, one known method uses a catalyst such as cuprous chloride, ferric chloride, zinc chloride, titanium chloride, aluminum chloride, and zirconium fluoride. Another known method is to carry out isomerization under an appropriate temperature without use of a catalyst.

In the former method, the isomerization velocity is slow, and high temperatures are required to carry out the reaction. As a result, the two isomers of dichlorbutene would become partly decomposed, into various by-products, such as 1-chlorobutadiene, hydrochloride, and others. Moreover, the yield of 3,4-dichlorobutene-1 is low. The latter method involves an even slower rate of reaction velocity, and disadvantageously produces a still greater number of by-products.

An object of this invention is to eliminate the foregoing disadvantages of the prior art methods.

According to this invention, 3,4-dichlorobutene-1 is obtained by heating 1,4-dichlorobutene-2 in the presence of a catalyst selected from the group consisting of (1) palladium, (2) palladous chloride, (3) organic complexes, such as benzonitrile and dimethylsulfoxide complexes, of palladous chloride, (4) organic complexes, such as benzonitrile and dimethylsulfoxide complexes, of the chlorides of copper, zinc and iron, and (5) mixtures thereof. For example, palladous chloride-benzonitrile, palladous chloride-dimethylsulfoxide may be used.

Palladium and palladous chloride may be used alone or mixed with a carrier, such as carbon, alumina, calcium carbonate, etc., in such a way that their per unit activation is increased.

The organic complexes may be formed by dissolving palladous chloride and chlorides of copper, zinc, and iron, using a solvent, such as benzonitrile, dimethylsulfoxide and other organic compounds under heated conditions. After dissolving in solvents, the catalysts may be cooled into crystals. Thereafter, the desired product may be obtained by filtering the crystals (see for example, Journal of the American Chemical Society, 1938, page 882).

Palladium and palladous chloride are not soluble in 1,4-dichlorobutene-2, but palladous chloride-benzonitrile and palladous chloride-dimethylsulfoxide, and organic complexes, such as benzonitrile and dimethylsulfoxide complexes, of the chlorides of copper, zinc and iron are soluble in it.

When the present catalysts or catalyzers are used, the time for the isomerizational reaction velocity is greatly shortened, and production of by-products is kept to a minimum. Thus, the isomer is produced at a high rate.

The amount of catalyst to be used is preferably less than 5.0 mole percent of the raw material 1,4-dichlorobutene-2, and more preferably from 0.1 to 1.0 mole percent. The speed of isomerization may be readily adjusted by increasing or decreasing the amount of catalyst used.

The reaction temperature is preferably within the range of from 80° C. to 160° C. When the temperature is below 80° C., the speed of isomerization reaction is slow. When the temperature is above 160° C., there is a tendency for side reactions to occur. Moreover, since the reaction system is in liquid phase, the temperature would be above its boiling point, thus making it necessary to use various pressure increasing devices.

The reaction system may be under normal, reduced, or increased pressure with normal or reduced pressure being preferable. Under normal pressure the system is easy to operate. On the other hand, under reduced pressure, the system tends to produce fewer by-products, if any at all. In using normal pressure, the upper range of the temperature of the liquid phase is about 150° C. to 155° C. Thus, advantageously, side-reaction due to high temperature does not take place. Under reduced pressure, the boiling point of the system in liquid phase is still lower, thus reducing further the amount of side-reactional products.

Dichlorobutene will decompose and produce by-products if left at a high temperature for any length of time. It is desirable to react dichlorobutene at a low temperature and within conditions wherein the isomerization would not be too slow. When dichlorobutene is reacted under reduced pressure, it is preferable to do so under pressure of about 100 to 200 mm. Hg and using temperatures within the range of from 80° C. to 125° C. Under these conditions, it is possible to obtain 3,4-dichlorobutene-1 at a high rate of yield and without producing much by-product.

Other features, objects and advantages of this invention will become more evident upon consideration of the following detailed description and drawing, which comprises a single figure.

The efficiency was found to be unusually high because the activity of the catalyst is extremely high and the initial velocity of reaction is also extraordinarily high. Such superior results have not obtained heretofore by known catalysts. The drawing demonstrates the outstanding results obtainable with use of the present invention.

Referring to the drawing, there is depicted a graph charting the rate of production of 3,4-dichlorobutene-1 from 1,4-dichlorobutene-2 against time for reaction. It can be readily appreciated that using the present catalysts the rate of production rises sharply during the initial period of reaction. This can be contrasted to use of CuCl (curve 5).

Turning to the curves, each represents different catalyst used or different operating condition. Curve 1 depicts results of using palladous chloride-2 dimethylsulfoxide in the reaction system. Curve 2 depicts the results of using palladous chloride-2 benzonitrile in the reaction system. Curve 4 depicts the results of using palladous chloride-2 dimethysulfoxide in the system. Curve 3 represents the results when cuprous chloride is used in the reaction system. Curve 5 depicts the results of using cuprous chloride in the system. Curve 6 depicts the results of using palladous chloride in the system. Curve 7 depicts the results of using ferric chloride-2 benzonitrile in the system. Curve 8 depicts results obtained by using zinc chloride-2 benzonitrile in the system. Finally, curve 9 depicts the results of using cupric chloride-2 dimethylsulfoxide in the system, and curve 10 depicts results obtained by using palladium carbon in the system.

In obtaining the above results which were plotted in the drawing, the experiments were conducted under normal pressure, and the temperatures were in the one case 135° C., for results plotted as curves 1, 3, 6, 7, 8, 9, and 10; and in the other case 100° C., for results plotted as curves 2, 4 and 5.

The activity of the catalyst is considerable. Moreover, the reaction may be carried out under a normal or reduced pressure. Thus, the length of time during which the raw material and the products desired are placed under high temperature is short. Thus, products produced by by-reaction are few, if any.

The following examples are set forth to substantiate the above statements, it being understood, however, that these examples are not restrictive of the scope of this invention.

EXAMPLE 1

100 parts by weight of 1,4 - dichlorobutene - 2 (purity 99%) and 0.7 part by weight of palladous chloride were placed in a reaction chamber equipped with a distillation column. The mixture was heated and 3,4-dichlorobutene-1 was obtained after distillation and collection. To obtain a comparison sample, the same procedure was carried out using cuprous chloride in place of palladous chloride. The results of the two are given below.

|  | Example 1 | Contrast example |
|---|---|---|
| Reaction temperature (° C.) | 155 | 155 |
| Duration of reaction (hours) | 1 | 3.5 |
| Amount of product obtained by evaporation (parts) | 95.0 | 90.5 |
| Composition of products obtained by distillation: | | |
| 3,4-dichlorobutene-1, percent | 92.0 | 89.3 |
| 1,4-dichlorobutene-2, percent | 6.5 | 5.5 |
| 1-chlorobutadiene (by-product), percent | 1.5 | 5.2 |
| Yielding percent of 3,4-dichlorobutene-1 | 93.3 | 85.5 |

EXAMPLE 2

The procedure of Example 1 was repeated except 0.4 part by weight of palladium-carbon (5% of palladium versus total weight of the catalyst) is used instead of 0.7 part by weight of palladous chloride. The yield of 3,4-dichlorobutene-1 was found to be 95.7%.

EXAMPLE 3

The same procedure of Example 1 was repeated, except zinc chloride-dimethylsulfoxide was used instead of palladous chloride. The yield of 3,4 - dichlorobutene was found to be 90.3%.

EXAMPLE 4

100 parts by weight of 1,4-dichlorobutene-2 (purity 99%) and 15 parts by weight of palladous chloride-dimethylsulfoxide complex salt were put in a container in the same manner as in Example 1. The mixture was then placed under agitation and under a pressure of 150 mm. Hg and at a temperature of 105° C. to 115° C. 3,4-dichlorobutene-1 was produced by distilling the mixture. The results obtained are given below.

A contrasting example was obtained by using the same procedure except one (1) part by weight of cuprous chloride was dispersedly adhered to a carrier (active clay or terra alba) and used in place of palladous chloride-dimethylsulfoxide. The results are summarized below.

|  | Example 4 | Contrast example |
|---|---|---|
| Reaction temperature (° C.) | 105–115 | 105–115 |
| Duration of reaction (hours) | 2.5 | 3.5 |
| Amount of product obtained by evaporation (parts) | 96 | 95 |
| Composition product obtained by distillation: | | |
| 3,4-dichlorobutene-1, percent | 99.85 | 99.6 |
| 1,4-dichlorobutene-2, percent | 0.1 | 0.1 |
| 1-chlorobutadiene, percent | 0.05 | 0.3 |
| Yield percent of 3,4-dichlorobutene-1 | 96.0 | 94.5 |

Various modifications and extensions of this invention will become apparent to those skilled in the art. All such variations and deviations which basically rely on the teachings, through which this invention has advanced the art, are properly considered within the spirit and scope of this invention.

What is claimed is:

1. A method of obtaining 3,4-dichlorobutene-1, comprising the step of heating 1,4-dichlorobutene-2 in the presence of a catalyst selected from the group consisting of palladium, palladous chloride, and mixtures thereof, and used in combination with a carrier selected from the group consisting of carbon, alumina, and calcium carbonate.

2. A method of obtaining 3,4-dichlorobutene-1, comprising the steps of mixing 100 parts by weight of 1,4-dichlorobutene-2, and 0.7 part by weight of palladous chloride, and heating the resulting mixture at a temperature of about 155° C. for a time of about 1 to 3½ hours.

3. A method of obtaining 3,4-dichlorobutene-1, comprising the steps of mixing 100 parts by weight of 1,4-dichlorobutene-2, and 0.4 part by weight of palladium on a carbon carrier and heating the resulting mixture at a temperature of about 155° C. for a time of about 1 to 3½ hours.

4. A method of obtaining 3,4-dichlorobutene-1, comprising the step of heating 1,4-dichlorobutene-2 in the presence of a catalyst selected from the group consisting of benzonitrile complex of palladous chloride, dimethylsulfoxide complex of palladous chloride, and mixtures thereof.

5. A method of obtaining 3,4-dichlorobutene-1, comprising the steps of mixing 100 parts by weight of 1,4-dichlorobutene-2, and 15 parts by weight of palladous chloride-dimethylsulfoxide complex, and heating at a temperature of about 105° C. to 115° C. for about from 2½ to 3½ hours, and under a pressure of about 150 mm. Hg.

References Cited

FOREIGN PATENTS

| 723,185 | 12/1965 | Canada | 260—654 |
| 798,889 | 7/1958 | England | 260—654 |

BERNARD HELFIN, Primary Examiner

J. A. BOSKA, Assistant Examiner

U.S. Cl. X.R.

252—429, 431